United States Patent
Varney

(10) Patent No.: US 9,188,075 B2
(45) Date of Patent: Nov. 17, 2015

(54) DIAGNOSTIC FOR ENGINE CAM PROFILE SWITCHING SYSTEM

(75) Inventor: Brian Varney, Coventry (GB)

(73) Assignee: JAGUAR LAND ROVER LIMITED, Whitley, Conventry (GB)

( * ) Notice: Subject to any disclaimer, the term of this patent is extended or adjusted under 35 U.S.C. 154(b) by 247 days.

(21) Appl. No.: 14/116,176

(22) PCT Filed: Apr. 30, 2012

(86) PCT No.: PCT/EP2012/057940
§ 371 (c)(1),
(2), (4) Date: Jan. 21, 2014

(87) PCT Pub. No.: WO2012/152614
PCT Pub. Date: Nov. 15, 2012

(65) Prior Publication Data
US 2014/0123940 A1 May 8, 2014

(30) Foreign Application Priority Data
May 11, 2011 (GB) .................................. 1107826.8

(51) Int. Cl.
*F01D 1/00* (2006.01)
*F02D 41/24* (2006.01)
(Continued)

(52) U.S. Cl.
CPC ............. *F02D 41/24* (2013.01); *F01L 13/0036* (2013.01); *F02D 13/02* (2013.01);
(Continued)

(58) Field of Classification Search
CPC ......................... F02D 2041/001; F02D 41/221
USPC .......... 123/90.1, 90.11–90.18, 347, 348, 321, 123/322; 73/114.31, 114.32, 114.77, 73/114.79
See application file for complete search history.

(56) References Cited

U.S. PATENT DOCUMENTS

| 6,213,068 | B1 | 4/2001 | Hassdenteufel | |
| 7,546,827 | B1 * | 6/2009 | Wade et al. | F01L 1/181 123/198 F |

(Continued)

FOREIGN PATENT DOCUMENTS

| EP | 1580407 A1 | 9/2005 |
| EP | 1811161 A1 | 7/2007 |

OTHER PUBLICATIONS

International Search Report for International Application No. PCT/EP2012/057940 dated Sep. 24, 2012.

*Primary Examiner* — John Kwon
(74) *Attorney, Agent, or Firm* — Carlson, Gaskey & Olds

(57) ABSTRACT

A momentary diagnostic for determining correct operation of a cam profile switching system of an internal combustion engine by calculation of changes in cylinder bank to bank air mass flow ratios: operating said engine in one condition of the cam profile switching system; providing for a first cylinder subset the inlet fuel flow and the corresponding oxygen content of the exhaust flow, and calculating the mass of air passing through the first cylinder subset in a defined time period; providing for a second cylinder subset the inlet fuel flow and the corresponding oxygen content of the exhaust flow; calculating the mass of air passing through the second cylinder subset in said defined time period; comparing the mass air flow the oxygen content for the first and second cylinder subsets to give a standard ratio; momentarily forcing the cam profile switching system of one of said cylinder subsets to an alternative condition; re-calculating providing the corresponding mass of air oxygen content passing through the first and second cylinder subsets; and comparing said recalculated air flows oxygen contents to give a revised ratio; and comparing said standard ratio and revised ratio.

19 Claims, 1 Drawing Sheet

(51) Int. Cl.
*F01L 13/00* (2006.01)
*F02D 41/00* (2006.01)
*F02D 41/22* (2006.01)
*F02D 13/02* (2006.01)
*F01L 1/14* (2006.01)

(52) U.S. Cl.
CPC ........ *F02D41/0002* (2013.01); *F02D 41/0082* (2013.01); *F02D 41/221* (2013.01); *F01L 1/143* (2013.01); *F01L 2800/11* (2013.01); *F01L 2820/01* (2013.01); *F02D 2041/001* (2013.01); *Y02T 10/18* (2013.01); *Y02T 10/42* (2013.01)

(56) References Cited

U.S. PATENT DOCUMENTS

| | | | |
|---|---|---|---|
| 7,621,175 B2 | 11/2009 | Varney | |
| 2003/0033997 A1* | 2/2003 | Yoshiki et al. | F01L 1/34 123/90.11 |
| 2005/0204805 A1 | 9/2005 | Wakahara et al. | |
| 2006/0169232 A1* | 8/2006 | Dosdall et al. | F01L 1/34 123/90.16 |
| 2008/0028844 A1* | 2/2008 | Varney | F01L 13/0015 73/114.69 |
| 2010/0122861 A1* | 5/2010 | Padilla et al. | F01L 1/34 180/65.28 |

* cited by examiner

DIAGNOSTIC FOR ENGINE CAM PROFILE SWITCHING SYSTEM

CROSS REFERENCE TO RELATED APPLICATIONS

This application claims priority from U.K. Patent Application No. 1107826.8 filed 11 May 2011, the entire contents of which are expressly incorporated by reference herein.

FIELD OF THE INVENTION

This invention relates to a diagnostic for indicating one of a plurality of camshaft conditions in an internal combustion engine. Aspects of the invention relate to a method, to a processor or electronic control unit, to an engine and to a vehicle.

BACKGROUND

Systems have been proposed for providing variation of camshaft condition, particularly for vehicles, so as to enhance the operating characteristics of the engine. In one example, a camshaft has dual profiles giving respective low and high inlet valve lift, and thus allowing a range of valve timing to enhance engine economy and performance. The relevant profile is selected, typically by a microprocessor based engine control unit (ECU), according to driver demand and other relevant parameters.

Many arrangements for switching cam profile have been proposed. One solution provides a dual tappet for each inlet valve. Each tappet operates on a low lift cam profile when engine is operated at low loads, but when engine is operating at high loads a high lift mode can be activated by a high pressure oil feed to engage a high lift cam profile, on demand.

The ECU controls other vehicle systems, particular systems for minimizing exhaust emissions, and for that purpose a diagnostic is required to confirm that the desired camshaft condition has been effected. In the example given above, it is not sufficient merely to monitor the presence or absence of a high pressure oil supply to a tappet, since the tappets themselves may malfunction.

It has accordingly been proposed to monitor the constituents of the engine exhaust, in particular the oxygen content, to confirm that the measured value lies within a range associated with the demanded camshaft condition. The ECU may for example include a look-up table giving the corresponding values for each camshaft condition by reference to fuelling and/or engine rpm.

U.S. Pat. No. 7,621,175 discloses a method of detecting degradation of a cam profile switching system in a Vee engine, which method compares the exhaust constituents of the two cylinder banks during a forced change of cam condition for one bank of the engine. If, for example, the oxygen concentration in the two exhaust streams is unchanged, it may be concluded that the cam profile switching system has degraded in the bank subjected to the forced change. Typically the alternative cam condition has not been adopted due to a malfunction in an electrical or hydraulic circuit.

In this arrangement, the forced change can be applied periodically to each bank, and for a short time during a suitable engine operating condition.

It would be advantageous to have an alternative diagnostic able to detect correct functioning of a varied camshaft condition.

SUMMARY OF THE INVENTION

According to one aspect of the present invention there is provided a method of detecting degradation of a cam profile switching system of a multi-cylinder internal combustion engine, the method comprising the steps of:
  operating said engine in one condition of the cam profile switching system;
  providing for a first cylinder subset, the inlet fuel flow and the corresponding oxygen content of the exhaust flow, and
  calculating the mass of air passing through the first cylinder subset in a defined time period;
  providing for a second cylinder subset the inlet fuel flow and the corresponding oxygen content of the exhaust flow, and calculating the mass of air passing through the second cylinder subset in said defined time period;
  comparing the mass air flow for the first and second cylinder subsets to give a standard ratio;
  momentarily forcing the cam profile switching system of one of said cylinder subsets to an alternative condition;
  re-calculating the corresponding mass of air passing through the first and second cylinder subsets, and comparing said recalculated air flows to give a revised ratio;
  and comparing said standard ratio and revised ratio to detect a significant change thereof.

The method is particularly, but not exclusively, suitable for Vee engines (also known as V-engines) having four or more cylinders arranged in two banks, each bank having a respective inlet tract and exhaust tract, and each bank having an independently operable cam profile switching system. The inlet tracts may be fed from a common source. The invention is also applicable to in-line engines having grouped cylinders and an independent cam profile switching system for each group.

By 'momentarily' we mean a sufficient minimum period for the cam profile switching system to generate a measurable change in the mass of air passing through the respective cylinders. This period will be engine specific, and can be determined empirically. For diagnostic purposes the momentary change should be as short as possible.

In one embodiment a cam profile switching system operates for 3-5 seconds, and the corresponding exhaust flow is analyzed for a period of 5-8 seconds to detect progressively the deviation of air flow and return to normal conditions.

In an embodiment, said standard ratio is provided in a camshaft condition corresponding to a low valve lift mode of the engine, and the cam profile switching system is momentarily forced to a camshaft condition corresponding to a high valve lift mode for calculating said revised ratio.

Typically, the standard ratio may show a difference in air flow in the range ±5%, whereas said revised ratio may show a difference in air flow in the range ±15%. In the invention a significant change of air flow ratio indicates no fault in the cam profile switching system.

Typically the method is applied in a throttle-off condition, where a momentary change in camshaft condition is unlikely to affect driving of the vehicle or to be noticed by the driver.

A momentary forced change of camshaft condition, from low to high lift for one group of cylinders will cause reduced air flow to that switched group, and by virtue of a shared inlet plenum may also cause increased air flow to the other (not switched) group. This forced change may thus cause one subset to momentarily have rich air/fuel mixture, whereas the other cylinder subset has a momentary lean air/fuel mixture.

A typical Vee gasoline engine uses catalytically coated substrates in the exhaust tract of each cylinder group to minimize tailpipe emissions. Effective operation of these exhaust catalysts typically requires that the exhaust gas stream is maintained at near to stoichiometric air:fuel ratios. In support of this the engines are provided with closed loop feedback control of fuelling, whereby an oxygen sensor in the exhaust tract determines whether the exhaust gases have an oxygen content indicative of non-stoichiometric combustion. The sensor output is used to continually adjust fuelling of the engine to compensate for a lean or rich mixture—thus gas flow through the catalyst is generally maintained at or close to stoichiometric, and harmful emissions can be minimized.

Considerable advances have been made in closed loop feedback control of fuelling, but this approach can only correct fuelling after a departure from the target air:fuel ratio has been identified. Accordingly it is possible that if a large disturbance is experienced in the exhaust gas air:fuel ratio the storage capacity of the catalysts may be exceeded and some undesirable emissions may pass to atmosphere even if closed loop feedback control is fast and accurate.

In a modification of the invention, the method further includes the steps of adjusting fuelling of the first and second cylinder subsets whilst said cam profile switching system is in the alternative condition, in order to obtain a desirable emissions characteristic.

Thus by fuelling the engine appropriately, for example by reference to a look-up table associating fuelling with camshaft condition, engine speed and throttle opening, harmful emissions can be further minimized. Again, a significant change of air flow ratio between the cylinder subsets is indicative of correct functioning of the cam profile switching systems.

As part of the calculation of the mass of air passing through the first and second cylinder subsets the method preferably includes incorporating a time delay to compensate for the period between the supply of a measured fuel quantity, and detecting the corresponding oxygen content of the exhaust flow at suitable exhaust sensors downstream of the respective exhaust ports of the engine.

As part of the definition of measurement timing, the method may also include incorporating a time delay to compensate for the period between forcing an alternative cam condition, and detecting the corresponding exhaust constituents.

Advantageous features of the invention are mentioned in the following description and in the claims appended hereto.

Within the scope of this application it is envisaged that the various aspects, embodiments, examples, features and alternatives set out in the preceding paragraphs, in the claims and/or in the following description and drawings may be taken independently or in any combination thereof. Features described in connection with one embodiment are applicable to all embodiments unless there is an incompatibility of features.

BRIEF DESCRIPTION OF THE DRAWINGS

One or more embodiments of the present invention will now be described, by way of example only, with reference to the accompanying drawings in which:—

DETAILED DESCRIPTION

Figure 1:
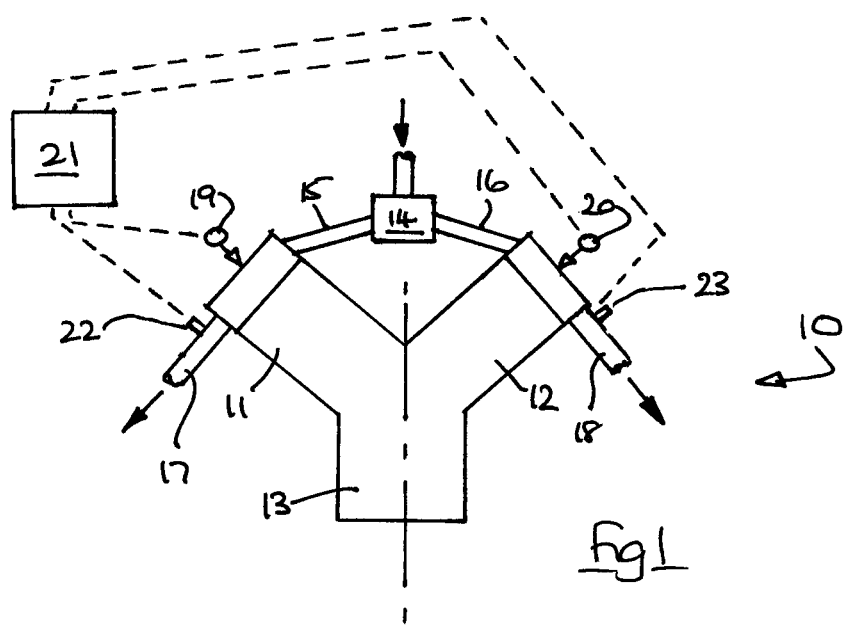
FIG. 1 is a schematic end elevation of a Vee engine with inlet, exhaust and fuel connections.

FIG. 1 illustrates in schematic cross-section a Vee engine (10) of for example six cylinders, and having left and right cylinder banks (11, 12) mounted to a common crankcase (13). A common air supply (14) feeds each bank via a respective inlet tract (15, 16), and each bank has its own respective exhaust tract (17, 18). A high pressure fuel injection rail (19, 20) is provided for each bank.

Within each cylinder head is a cam profile switching system of conventional kind, which permits switching on-demand between high lift and low lift conditions for the inlet valves. The cam profile switching systems are generally actuated together in normal engine operation so that the selected operating condition is common, but they are also actuated independently in the diagnostic of the present invention.

A conventional electronic control unit (ECU) (21) is provided to control engine fuelling and other systems in accordance with driver demand and emissions legislation. Within each exhaust tract a lambda (oxygen) sensor (22, 23) is provided, and adapted to send instantaneous measurements of air/fuel ratio to the ECU.

In this invention mass fuel flow is provided as an input to the ECU by any suitable means. Each oxygen sensor (22, 23) provides an indication to the ECU of air/fuel ratio. The ECU is also programmed to calculate the time for a change in fuelling to be reflected in a corresponding change of the output of the sensors (22, 23). This time delay is a function of engine rpm and the downstream location of the sensors (22, 23); more specifically the exhaust mixture volumetric flow rate and the exhaust system volume upstream of the sensor. It may for example be provided in a look-up table by reference to instantaneous engine rpm, air mass flow, engine load, air pressure and/or exhaust temperature.

Figure 2:
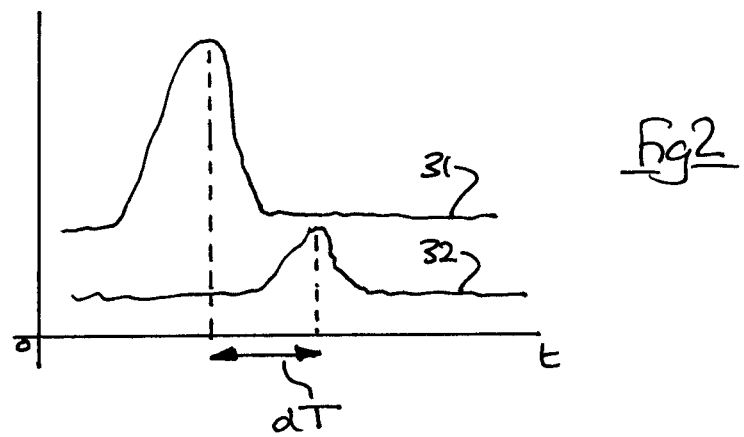
FIG. 2 illustrates graphically a time delay between increased fuel flow and corresponding detection of exhaust emissions.

FIG. 2 illustrates a plot of momentary increase of fuel or air flow (31) against a corresponding change in the concentration of exhaust emissions (32), and the corresponding delay dT at a pre-determined engine rpm (or exhaust mixture volumetric flow rate). This delay dT will generally reduce as engine rpm, and hence speed of exhaust flow (volume flow rate), increases. If fuelling is adjusted according to change of air flow, the characteristic (32) will be flat, but the time dT nevertheless indicates the lag between change of inlet conditions, and detection of corresponding exhaust constituents.

The ECU is adapted to calculate from fuel flow and air/fuel ratio of the exhaust (with reference to the time delay) a measure of inlet air flow to each cylinder bank. It is not however necessary in the invention to determine an absolute volumetric air flow, but merely to relate the air flow of each bank as a dimensionless ratio L/R.

In an engine of good condition, with each bank (11, 12) contributing equally, the standard ratio L/R is usually very close to 1, and typically has a variation not greater than ±5%.

The camshaft diagnostic of the invention is preferably operated in a throttle-off condition, where it is less noticeable to the driver. In this condition the camshafts are typically in a low lift condition.

The camshaft of one bank, for example bank (11), is momentarily forced to a high lift condition. As a result the throughput of air changes, and the exhaust gas constituents will change if fuelling remains unchanged. The corresponding throughput of air in second bank may also change as air is drawn differently through the first bank, and the exhaust gas concentration from the second bank may also change if fuelling remains unchanged. Fuelling of the first and second banks is however preferably adjusted to compensate for the change of air flow, so as to maintain accurate catalyst control and subsequently deliver minimal harmful emissions.

During the momentary high lift condition of one bank, with allowance for delay dT, the ratio L/R is recalculated and compared with the standard ratio. If the recalculated air flow ratio is substantially changed, typically ±15%, correct camshaft position is indicated. If the recalculated air flow ratio is within the standard range of ±5% (i.e. unchanged), incorrect camshaft position is indicated. Thus it can be determined whether the cam profile switching system is working correctly.

Figure 3:
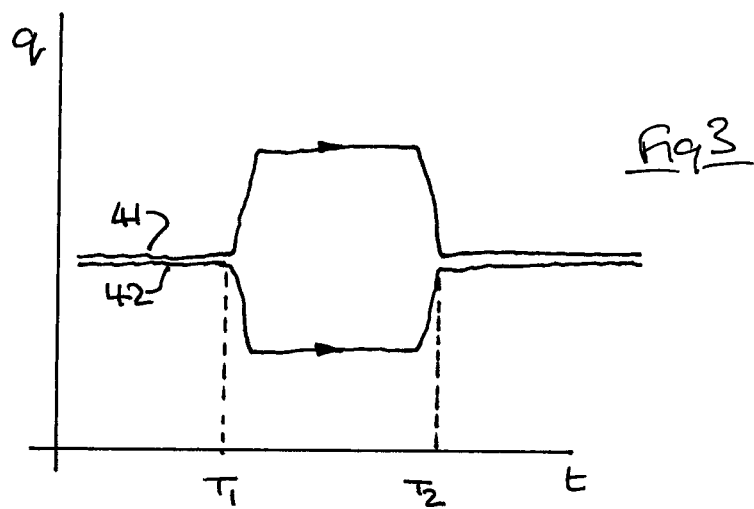
FIG. 3 illustrates graphically a variation in air flow during a forced change of camshaft condition.

An important feature of the invention, for engines with common air source, is that when air flow through one bank is momentarily increased, the air flow through the other bank is correspondingly reduced, thus enhancing the tendency towards a changed air flow ratio. Absolute determination of air flow is not required. FIG. 3 graphically illustrates the effect of an air flow (41, 42) of the two banks (11, 12) where bank (11) switches to high lift at time T, and back to low lift at time $T_2$. $T_1-T_2$ may be in the range 2-3 seconds. A slight difference in nominal air flow is immaterial because the differential provided by the invention is substantial.

It will be understood that, depending on the cam profile, a high lift cam may result in an increased volume air flow, or a reduced volume air flow as compared with a low lift cam profile.

The invention claimed is:

1. A method of detecting degradation of a cam profile switching system of a multi-cylinder internal combustion engine, the method comprising:
    operating said engine in one condition of the cam profile switching system;
    calculating a mass of air passing through a first cylinder subset in a defined time period;
    calculating a mass of air passing through a second cylinder subset in said defined time period;
    comparing the mass air flow for the first and second cylinder subsets to give a standard ratio;
    momentarily forcing the cam profile switching system of one of said cylinder subsets to an alternative condition;
    re-calculating the corresponding mass of air passing through the first and second cylinder subsets, and comparing said recalculated air flows to give a revised ratio; and
    comparing said standard ratio and revised ratio.

2. A method as claimed in claim 1, wherein said cam profile switching system is momentarily forced to said alternative condition during a throttle closed condition of the engine.

3. A method as claimed in claim 1, wherein the alternative condition is terminated in the event of an increase in throttle demand.

4. A method as claimed in claim 1, wherein said cam profile switching system is forced from a low lift condition to a high lift condition.

5. A method as claimed in claim 1, comprising adjusting fuelling during said momentary forcing of the cam profile switching system in order to obtain a desired exhaust emissions characteristic.

6. A method as claimed in claim 5, wherein fuelling is adjusted to maintain stoichiometric combustion.

7. A method as claimed in claim 5, including comprising determining a delay between adjusting fuelling and sensing a corresponding oxygen content of the exhaust at a downstream sensor, and
    relating an oxygen content to the corresponding fuel flow when calculating said mass air flows and ratios.

8. A method as claimed in claim 7, wherein said delay is provided from a look-up table by reference to engine speed.

9. A method as claimed in claim 7, wherein said delay is provided from an algorithm by reference to engine speed.

10. A method as claimed in claim 7, wherein said delay is provided by one of a number of engine revolutions and a crank angle.

11. A method as claimed in claim 1, wherein said delay is represented by mass flow of one of air, fuel and air/fuel mixture.

12. A method as claimed in claim 1 implemented in a V engine having a plurality of banks of the cylinders and an independent cam profile switching system for each bank of cylinders.

13. An electronic control unit or processor configured to perform a method of detecting degradation of a cam profile switching system of a multi-cylinder internal combustion engine, the method comprising:
    operating said engine in one condition of the cam profile switching system;
    calculating a mass of air passing through a first cylinder subset in a defined time period;
    calculating mass of air passing through a second cylinder subset in said defined time period;
    comparing the mass air flow for the first and second cylinder subsets to give a standard ratio;
    momentarily forcing the cam profile switching system of one of said cylinder subsets to an alternative condition;
    re-calculating the corresponding mass of air passing through the first and second cylinder subsets, and comparing said recalculated air flows to give a revised ratio; and
    comparing said standard ratio and revised ratio.

14. An engine or a vehicle having an electronic control unit or processor as claimed in claim 13.

15. A method of detecting degradation of a system of a multi-cylinder internal combustion engine, the method comprising:
    operating said engine in a first condition including a first valve lift mode;
    determining a first mass of air passing through a first cylinder subset of the engine, the first mass of air corresponding to the first condition;
    determining a second mass of air passing through a second cylinder subset of the engine, the second mass of air corresponding to the first condition;
    determining a standard ratio based on the first mass of air and second mass of air;
    momentarily forcing one of said cylinder subsets to a second condition corresponding to a second valve lift mode;
    determining a revised first mass of air passing through the first cylinder subset corresponding to the second condition;
    determining a revised second mass of air passing through the second cylinder subset corresponding to the second condition;
    determining a revised ratio based on the revised first mass of air and the revised second mass of air; and
    determining a relationship between the standard ratio and the revised ratio.

16. A method as claimed in claim 15, wherein the second valve lift mode results in a changed mass of air compared to the first valve lift mode.

17. A method as claimed in claim 15, wherein the second valve lift mode corresponds to one of a high valve lift mode and a low valve lift mode and the first valve lift mode corresponds to the other of said high valve lift mode and said low valve lift mode.

18. A method as claimed in claim 15, wherein the relationship between the standard ratio and the revised ratio indicates a condition of camshaft position.

19. A method as claimed in claim 15, further comprising:
providing inlet fuel flow and a corresponding oxygen content of exhaust flow for each of the first and second cylinder subsets as inputs to an ECU;
wherein determining the first mass of air, determining the second mass of air, determining the revised first mass of air and determining the revised second mass of air each comprise calculating the mass of air on the basis of the inlet fuel flow and the corresponding oxygen content.

* * * * *